United States Patent
Gorczowski et al.

(10) Patent No.: US 8,667,419 B2
(45) Date of Patent: Mar. 4, 2014

(54) METHOD AND APPARATUS FOR DISPLAYING A MENU FOR ACCESSING HIERARCHICAL CONTENT DATA INCLUDING CACHING MULTIPLE MENU STATES

(75) Inventors: Robert E. Gorczowski, Frankfort, IL (US); Paul T. Klawitter, Frankfort, IL (US)

(73) Assignee: Applied Systems, Inc., University Park, IL (US)

( * ) Notice: Subject to any disclaimer, the term of this patent is extended or adjusted under 35 U.S.C. 154(b) by 756 days.

(21) Appl. No.: 12/207,442

(22) Filed: Sep. 9, 2008

(65) Prior Publication Data

US 2010/0064258 A1    Mar. 11, 2010

(51) Int. Cl.
*G06F 3/048* (2013.01)
(52) U.S. Cl.
USPC ........... 715/841; 715/817; 715/818; 715/819; 715/820; 715/853
(58) Field of Classification Search
USPC .................. 715/817, 818, 819, 820, 841, 853
See application file for complete search history.

(56) References Cited

U.S. PATENT DOCUMENTS

| | | | |
|---|---|---|---|
| 4,868,766 A | 9/1989 | Oosterholt | |
| 5,528,735 A | 6/1996 | Strasnick | |
| 5,546,529 A | 8/1996 | Bowers | |
| 5,559,944 A * | 9/1996 | Ono | 715/841 |
| 5,560,005 A * | 9/1996 | Hoover et al. | 1/1 |
| 5,655,085 A * | 8/1997 | Ryan et al. | 705/4 |
| 5,786,820 A | 7/1998 | Robertson | |
| 6,035,330 A | 3/2000 | Astiz | |
| 6,054,989 A | 4/2000 | Robertson | |
| 6,067,086 A * | 5/2000 | Walsh | 715/808 |
| 6,072,492 A * | 6/2000 | Schagen et al. | 715/733 |
| 6,085,184 A | 7/2000 | Bertrand | |
| 6,278,450 B1 | 8/2001 | Arcuri | |
| 6,373,488 B1 | 4/2002 | Gasper | |

(Continued)

FOREIGN PATENT DOCUMENTS

| JP | 2003099809 | 4/2003 |
|---|---|---|
| JP | 2004272609 | 9/2004 |

OTHER PUBLICATIONS

Microsoft Windows Explorer and Outlook 2007 main application.

(Continued)

*Primary Examiner* — Boris Pesin
*Assistant Examiner* — Matthew Ell
(74) *Attorney, Agent, or Firm* — K&L Gates LLP

(57) ABSTRACT

A system and method for displaying a set of hierarchical menu items is disclosed. Each menu item may be associated with at least one sub-item and/or with content data. Each sub-item may be associated with content data for display upon selection of the sub-item. The system simultaneously displays each menu item in a list format. Upon selection of one of the menu items, the system displays each sub-item associated with the selected menu item. For any selected sub-item, the system displays the display data associated with the selected sub-item and stores data indicating that the selected sub-item is the most recently-selected sub-item associated with the selected menu item. When any menu item is selected, the system determines the most recently-selected sub-item (if any) associated with the selected menu item and displays the display data associated with the most recently-selected sub-item.

34 Claims, 9 Drawing Sheets

(56) References Cited

U.S. PATENT DOCUMENTS

| | | |
|---|---|---|
| 6,421,072 B1 | 7/2002 | Ku |
| 6,628,307 B1 | 9/2003 | Fair |
| 6,972,765 B1 | 12/2005 | Duplat |
| 7,013,435 B2 | 3/2006 | Gallo |
| 7,143,392 B2 | 11/2006 | Ii |
| 7,168,050 B1 * | 1/2007 | Kwon et al. .................. 715/843 |
| 7,185,333 B1 | 2/2007 | Shafron |
| 7,197,752 B2 | 3/2007 | Miller |
| 7,249,319 B1 | 7/2007 | Payne |
| 7,340,678 B2 | 3/2008 | Chiu |
| 2001/0042063 A1 | 11/2001 | Ebert |
| 2002/0070953 A1 | 6/2002 | Barg |
| 2003/0005002 A1 * | 1/2003 | Chen et al. .................... 707/515 |
| 2003/0193528 A1 | 10/2003 | Stegbauer |
| 2004/0061720 A1 | 4/2004 | Weber |
| 2006/0288280 A1 * | 12/2006 | Makela ......................... 715/530 |
| 2007/0013690 A1 | 1/2007 | Grimaud |
| 2007/0101296 A1 * | 5/2007 | Won et al. ..................... 715/841 |
| 2008/0016472 A1 | 1/2008 | Rohlf |
| 2008/0109472 A1 | 5/2008 | Underwood |
| 2008/0148190 A1 | 6/2008 | Schaff |
| 2009/0288034 A1 * | 11/2009 | Childress et al. ............. 715/781 |

OTHER PUBLICATIONS

International Search Report mailed Nov. 13, 2009 and International Preliminary Report on Patentability mailed Mar. 24, 2011 for International Application No. PCT/US2009/056376.

* cited by examiner

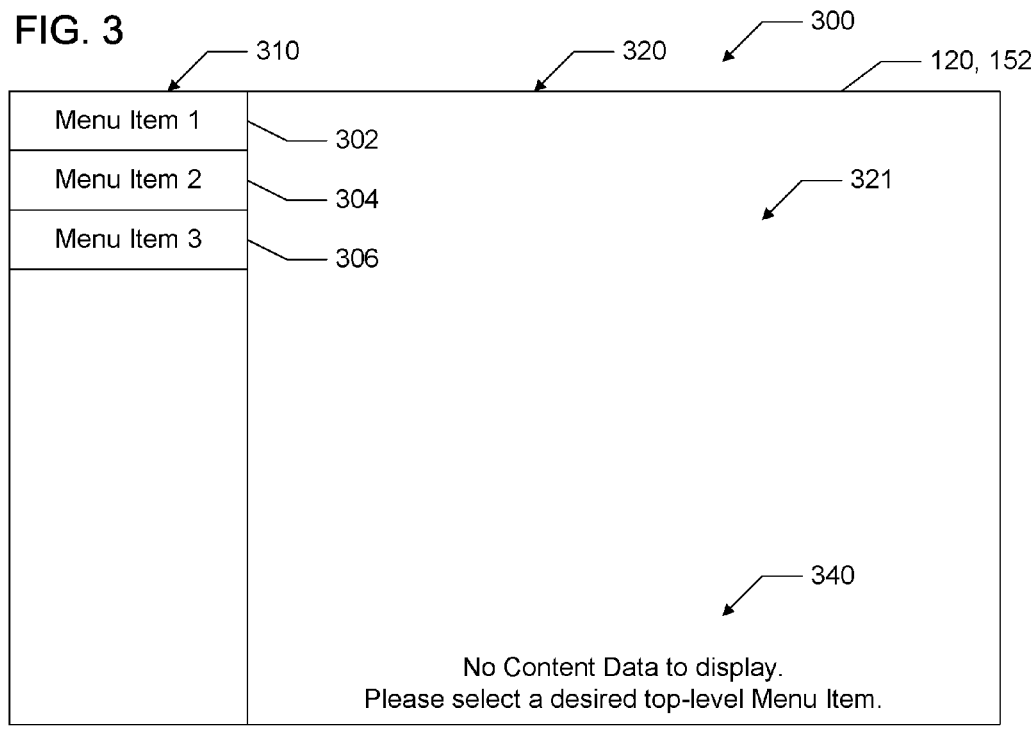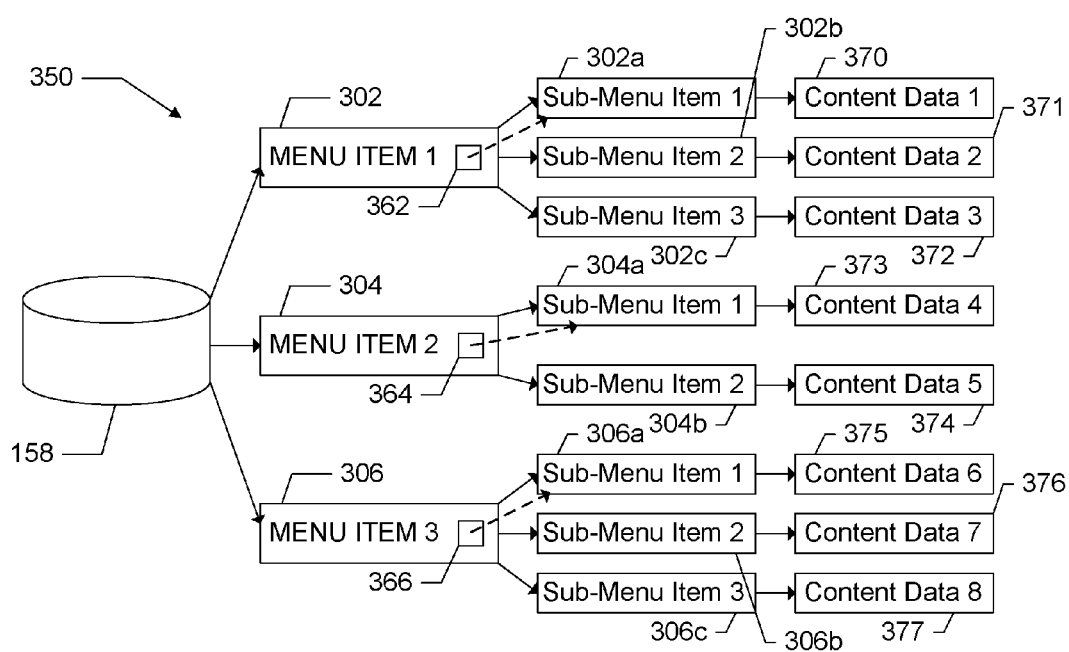

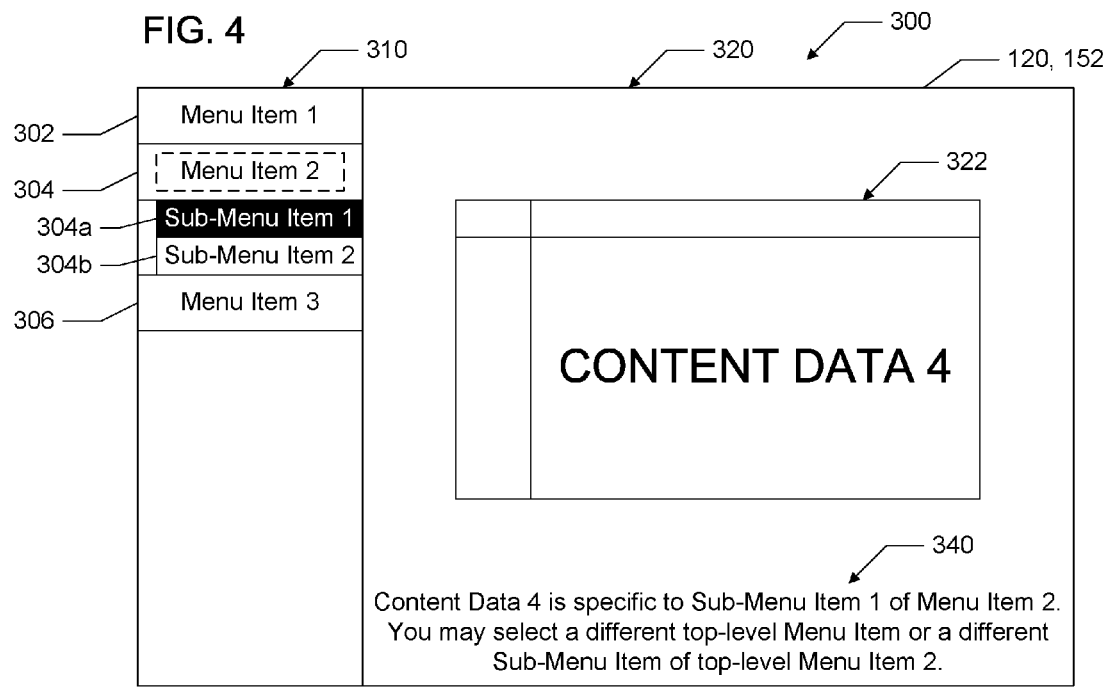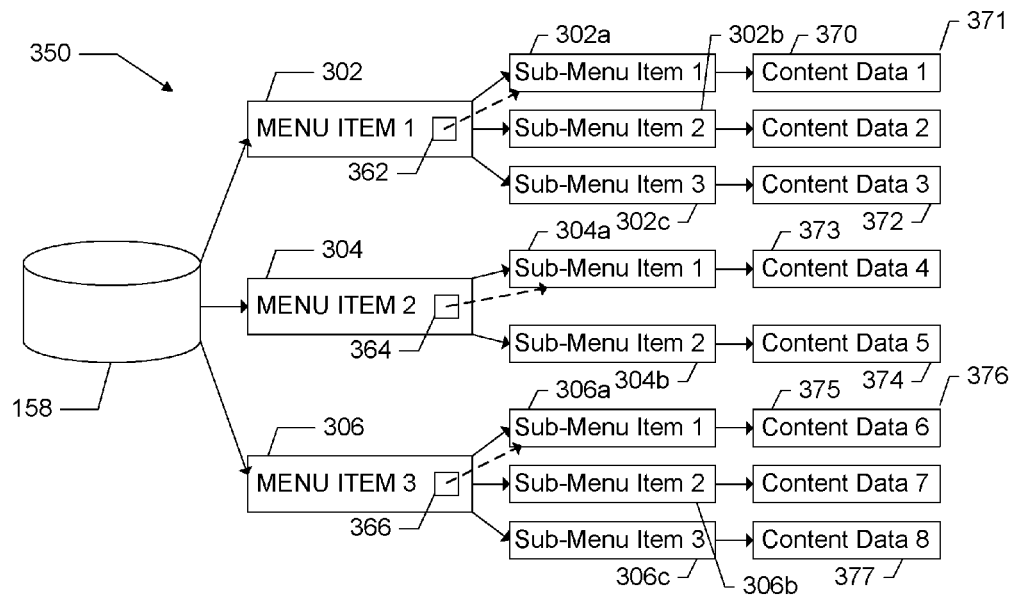

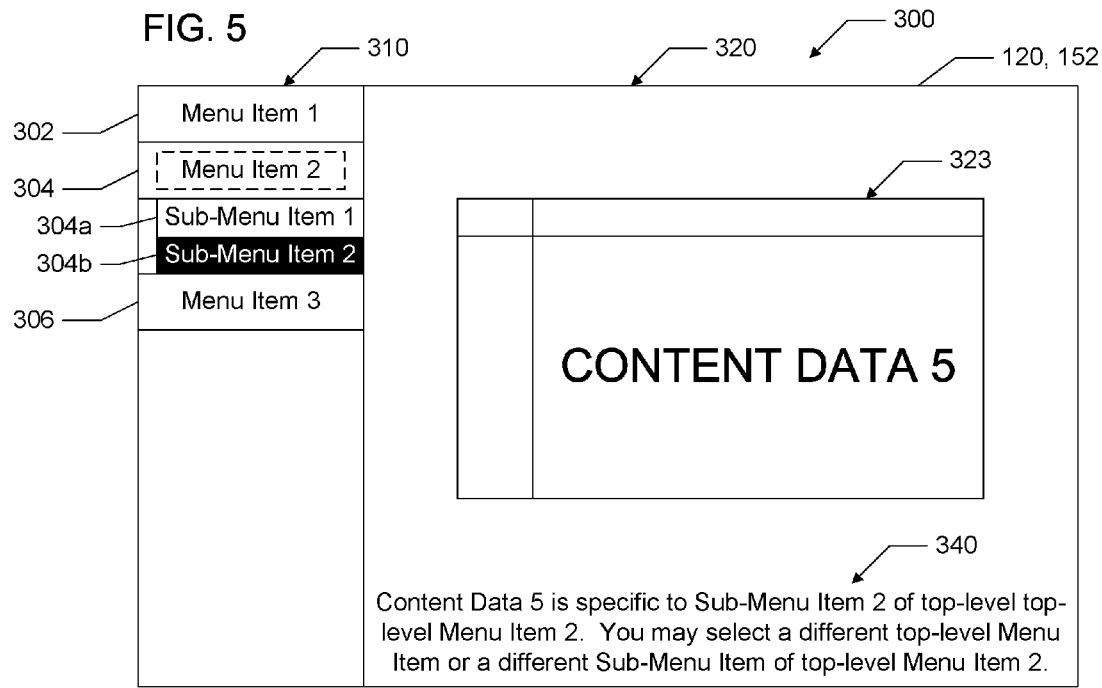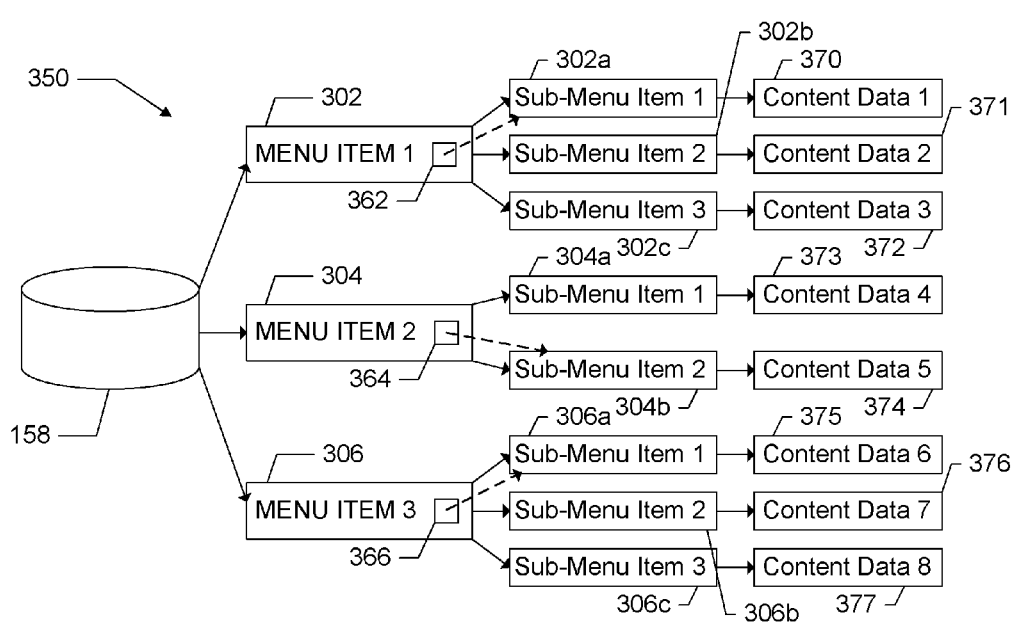
FIG. 5

FIG. 6
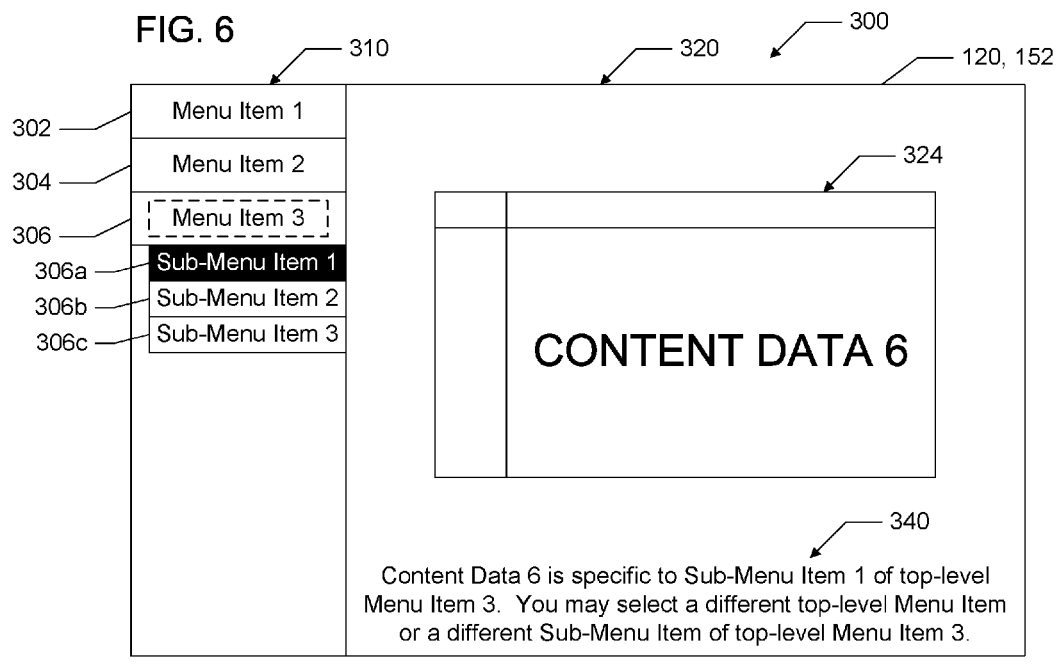
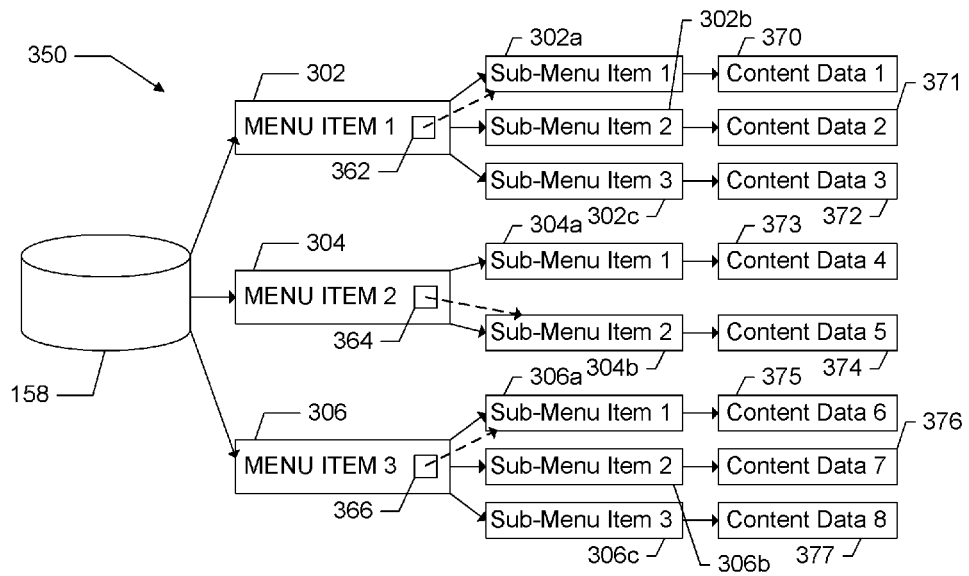

FIG. 7
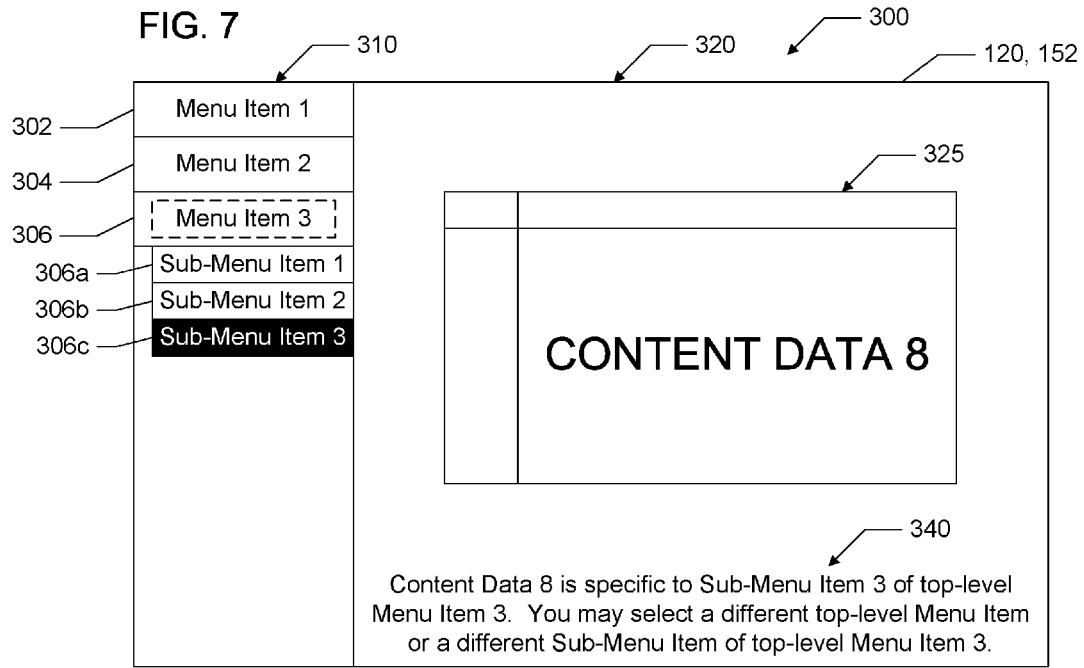
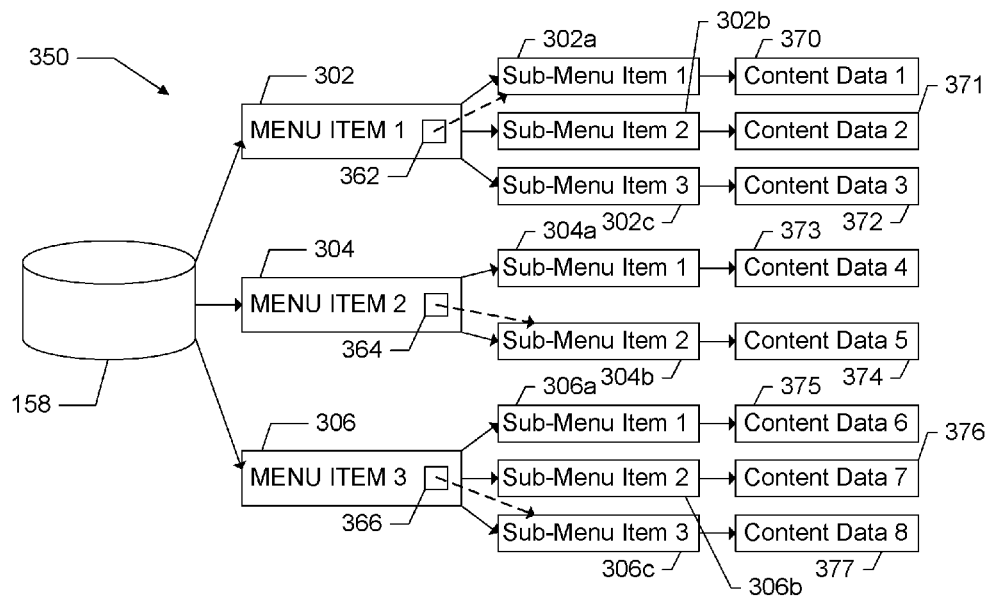

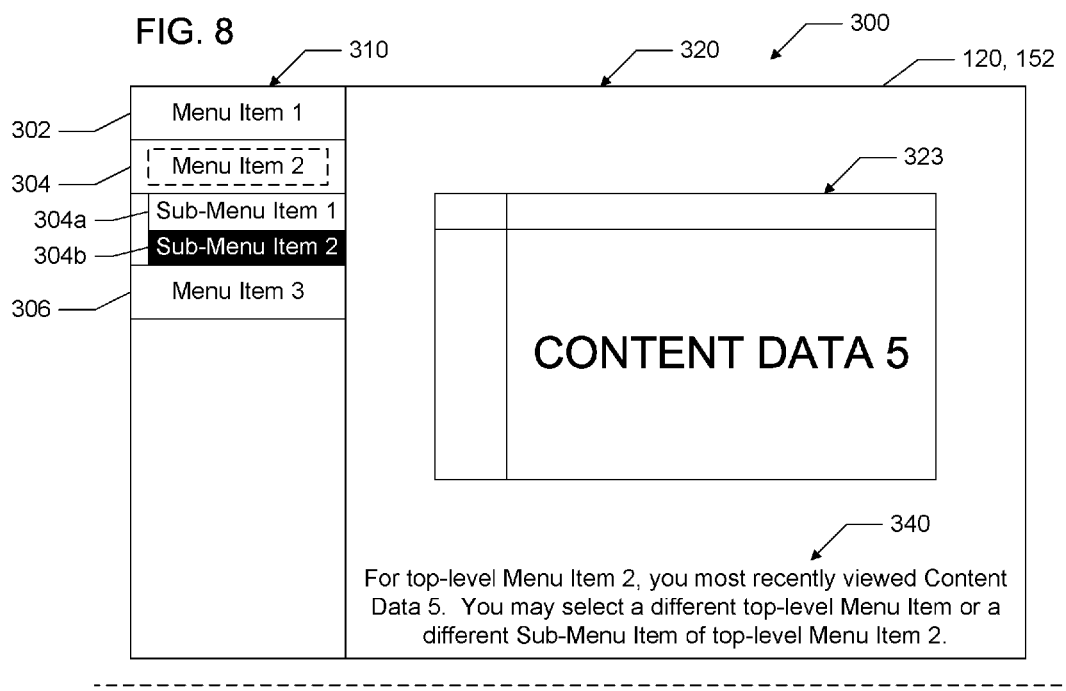
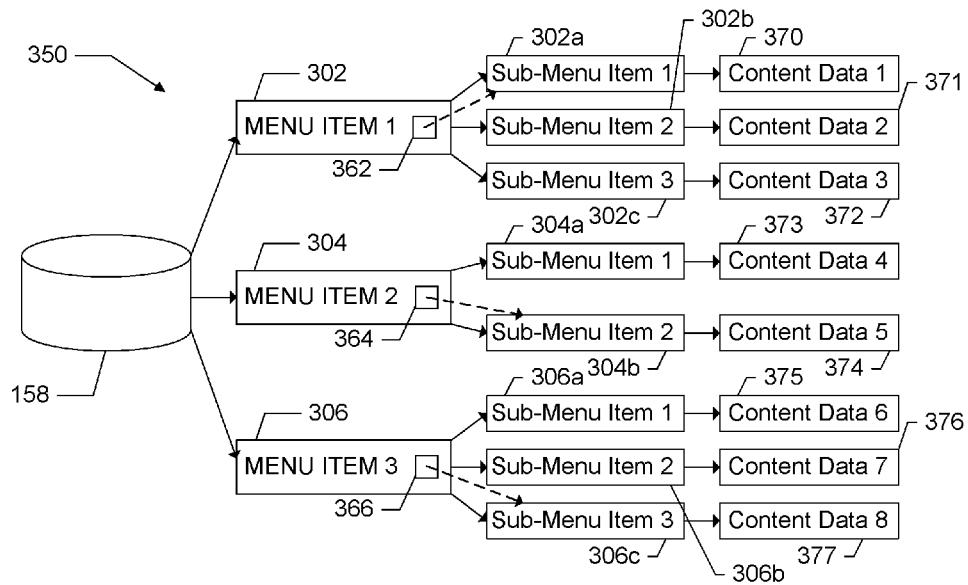
FIG. 8

FIG. 9
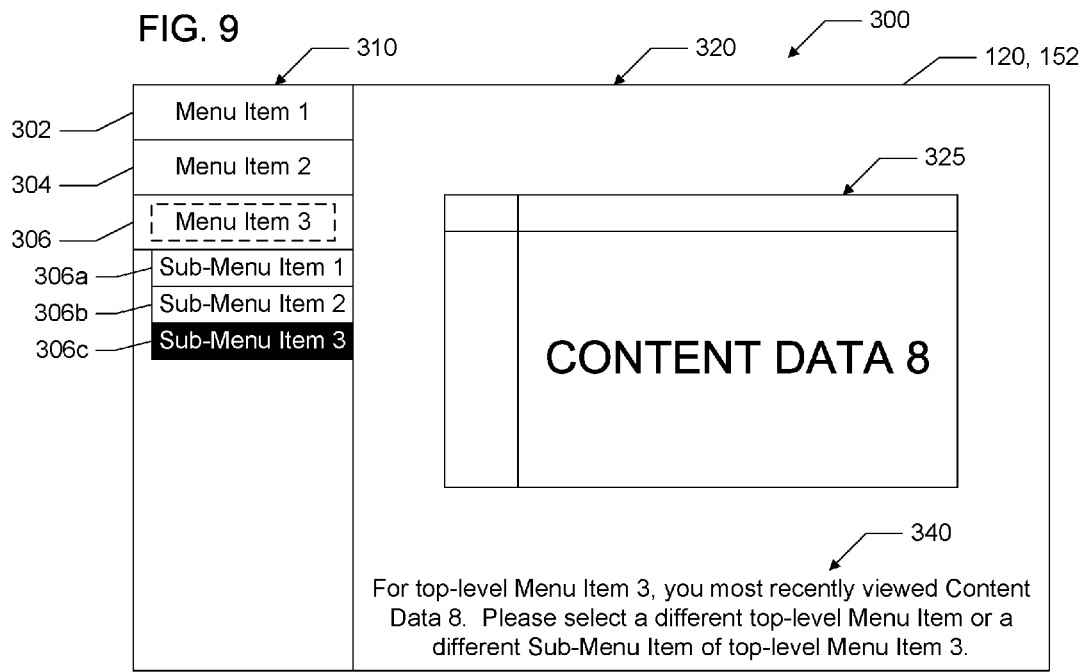
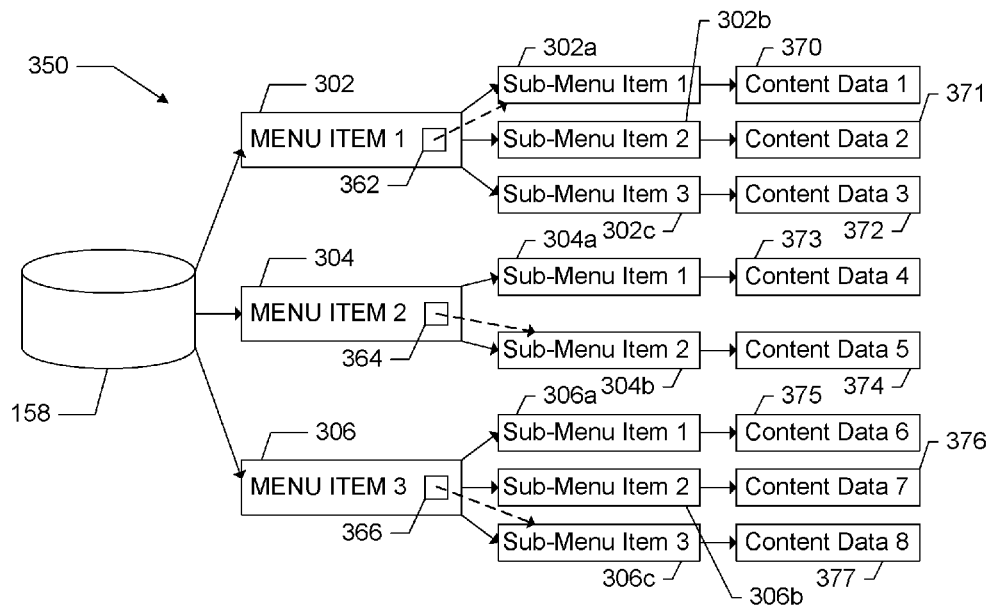

METHOD AND APPARATUS FOR DISPLAYING A MENU FOR ACCESSING HIERARCHICAL CONTENT DATA INCLUDING CACHING MULTIPLE MENU STATES

CROSS-REFERENCE TO RELATED APPLICATIONS

This application is related to the following co-pending commonly-owned patent applications: U.S. application Ser. No. 12/207,448 filed Sep. 9, 2008, entitled "METHOD AND APPARATUS FOR REMOTELY DISPLAYING SCREEN FILES AND EFFICIENTLY HANDLING REMOTE OPERATOR INPUT," currently pending; U.S. application Ser. No. 12/207,425 filed Sep. 9, 2008, entitled "METHODS AND APPARATUS FOR DELIVERING DOCUMENTS," currently pending; U.S. application Ser. No. 12/207,449 filed Sep. 9, 2008, entitled "METHOD, SYSTEM, AND APPARATUS FOR SCANNING AND IMPORTING DOCUMENTS," currently pending; and U.S. application Ser. No. 12/207,436 filed Sep. 9, 2008, entitled "METHOD AND APPARATUS FOR REMOTELY DISPLAYING A LIST BY DETERMINING A QUANTITY OF DATA TO SEND BASED ON THE LIST SIZE AND THE DISPLAY CONTROL SIZE," currently pending; and U.S. application Ser. No. 12/207,454 filed Sep. 9, 2008, entitled "METHOD, SYSTEM, AND APPARATUS FOR SECURE DATA EDITING," currently pending, the entire contents of each of which is incorporated by reference herein.

TECHNICAL FIELD

The present system relates in general to computerized content data access systems, and more specially to an intelligent system for accessing content data organized with a hierarchical menu structure.

BACKGROUND

Database access software enables a software operator such as a database administrator or a database user to access vast amounts of content data. Specifically, such software enables the operator to view, manage, and modify some or all of the content data stored in large databases. To facilitate easy access to such data, database access software frequently provides an interface which displays data as grouped into one or more groups or sets of data which share one or more common characteristics. For example, database access software may display a plurality of selectable menu items to the operator which enable the operator to view only desired categories of data associated with the menu items.

Especially for large, complex databases, a menu system including a single tier of groups does not enable quick and easy access to the data. For example, organizing a large database into hundreds or thousands of groups or sets of data in a single tier, though helpful, can still present a cumbersome and unmanageable interface for an operator wishing to quickly access specific content data within the database.

Various software vendors have therefore developed more advanced menu systems to facilitate easier access to similar quantities of data. These menu systems are frequently designed with a hierarchical structure such that an operator is initially presented with a high-level grouping of a relatively small number of broad categories. By selecting one of the broad categories, such menu systems present the operator with a second level or tier of categories which is narrower than the high-level group of categories, wherein each of the categories of the second level or tier is a logical subset of the selected high-level category. The menu system enables the operator to select one of the more specific second level categories to further refine the content data which is displayed and modified.

In certain menu systems, some of the selectable categories or menu items are associated with content data which is displayed upon selection of that category or menu item. In these systems, the content data represents a potential destination, such as a database record into which data is entered, in which data is viewed or modified, or from which data is extracted. By navigating through the selectable categories or menu items of such menu systems, an operator may reach a desired destination and may manipulate the content data associated therewith as the operator sees fit. For example, the operator may serially select a top-level menu item and one or more lower-level menu items to arrive at desired content data.

Hierarchical or tiered menu systems can have tens or hundreds of hierarchical layers or tiers representing thousands or millions or sets of content data, particularly in data-intensive systems wherein the stored content data is measured in gigabytes or terabytes. Thus, in such systems, an operator may select tens or hundreds of sub-categories before finally reaching a menu item which is associated with the sought content data. If the operator needs to frequently switch between certain sets of content data to effectively utilize a large database (e.g., three different data viewing/entry screens), it can become cumbersome to repeatedly select a plurality of sub-categories to repeatedly access the same data (e.g., to switch between three different screens). In certain industries, such as the insurance industry, this problem is exacerbated by a frequent need of operators to repeatedly alternate between viewing data contained multiple tiers below different high-level menu options.

SUMMARY

The system disclosed herein overcomes the described deficiencies of the prior art by providing an intelligent menu system for accessing content data which stores indicators of recently accessed sub-menu items and content data for quick subsequent retrieval. Specifically, the system disclosed herein stores a hierarchical menu structure for facilitating access to content data of a database wherein for each selection made of one of the sub-menu items of the hierarchical menu structure, the system stores data indicating that the selection is the most recent selection. The system may store this data in association with the highest or top-level menu item associated with the selected sub-menu item. Each time an operator selects a different one of the top-level menu items, the disclosed system determines whether any stored data indicates a most recently accessed sub-menu item. If so, the disclosed system automatically directs the operator to the most recently accessed sub-menu item, displaying the content data associated with that sub-menu item and the hierarchical structure of that sub-menu item. The disclosed system thus enables an operator to quickly return to recently accessed content data associated any of a plurality of top-level menu items without navigating through each of the layers of the hierarchical menu structure of the content data associated with the top-level menu item. The disclosed system enables this quick access regardless of the quantity of levels or tiers of a menu system of a large database.

Additional features and advantages are described herein, and will be apparent from the following Detailed Description and the figures.

BRIEF DESCRIPTION OF THE FIGURES

FIGS. 3 to 9 are combination screen shots and corresponding memory schematic diagrams underlying the data displayed in the screen shots of an example of the content data access system disclosed herein.

DETAILED DESCRIPTION

Figure 1:
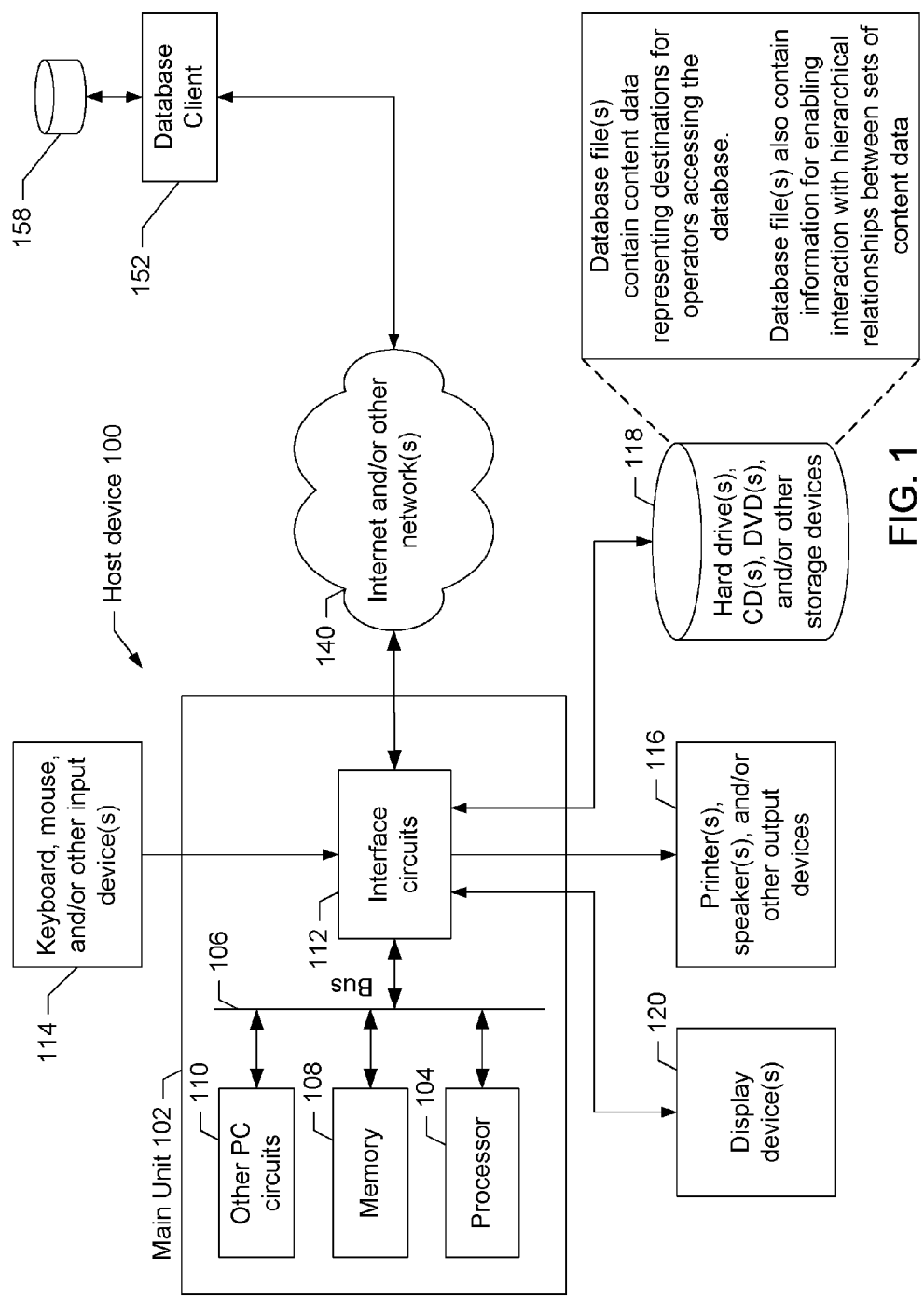
FIG. 1 is a block diagram of an example system architecture for implementing the content data access system disclosed herein.

FIG. 1 is a block diagram of an example system architecture for implementing the content data access system disclosed herein. Specifically, FIG. 1 illustrates a schematic block diagram of a host device (e.g., host device 100) for implementing the content data access system disclosed herein. In the example architecture, the host device 100 includes a main unit 102 which preferably includes one or more processors 104 electrically coupled by an address/data bus 106 to one or more memory devices 108, other computer circuitry 110, and one or more interface circuits 112. The processor 104 may be any suitable processor. The memory 108 preferably includes volatile memory and non-volatile memory. Preferably, the memory 108 stores a software program that interacts with the other devices in the system as described below. This program may be executed by the processor 104 in any suitable manner. The memory 108 may also store digital data indicative of documents, files, programs, web pages, etc. retrieved from a database client 152, such as modifications made remotely to any menu items or content data using the database client 152.

The interface circuit 112 may be implemented using any suitable interface standard, such as an Ethernet interface and/or a Universal Serial Bus (USB) interface. One or more input devices 114 may be connected to the interface circuit 112 for entering data and commands into the main unit 102. For example, the input device 114 may be a keyboard, mouse, touch screen, track pad, track ball, isopoint, and/or a voice recognition system.

One or more displays 120 or printers, speakers, and/or other output devices 116 may also be connected to the main unit 102 via the interface circuit 112. The display 120 may be a cathode ray tube (CRT), liquid crystal display (LCD), or any other type of display. The display 120 generates visual displays of data generated during operation of the host device 100, such as those screen shots described below. For example, the display 120 may be used to display database records received from a host device. The visual displays may include prompts for human input, run time statistics, calculated values, data, etc. In one example described in more detail below, the display 120 may show a plurality of menu items including top-level menu items and sub-menu items, the menu items representing a plurality of categories of insurance data and content data associated therewith.

One or more storage devices 118 may also be connected to the main unit 102 via the interface circuit 112. For example, a hard drive, CD drive, DVD drive, and/or other storage devices may be connected to the main unit 102. The storage devices 118 may store any type of data used by the host device 100. In one example described in more detail below, the storage device 118 stores database information including top-level menu items, sub-menu items, data indicating the hierarchical relationship between the top-level menu items and the sub-menu items, and content data associated with the sub-menu items.

The host device 100 may also exchange data with the remote database client 152 using a connection to network 140. The network connection may be any suitable network connection, such as an Ethernet connection, digital subscriber line (DSL), telephone line, coaxial cable, etc. Access to a host device 100 may be controlled by appropriate security software or security measures. An individual operator's access can be defined by the host device 100 and limited to certain data and/or actions. Accordingly, operators of the system may be required to register with one or more host devices 100. The data exchanged between the host device 100 and the database client 152 may include screen files (i.e., image data for display at the database client 152), trapped events at the database client 152, and raw data including top-level menu items sub-menu items, and content data stored on the storage device 118 and manipulable at the database client 152. The database client 152 may be further configured to cache or otherwise store certain of the data sent to the database client 152 by the host device 100, such as by storing the data in a storage device 158 connected to the database client 152. The database client storage device 158 may be any suitable memory or data storage device such as RAM, a hard disk, an optical disk drive, a tape drive, a flash drive, or any other suitable storage or memory device.

Figure 2:
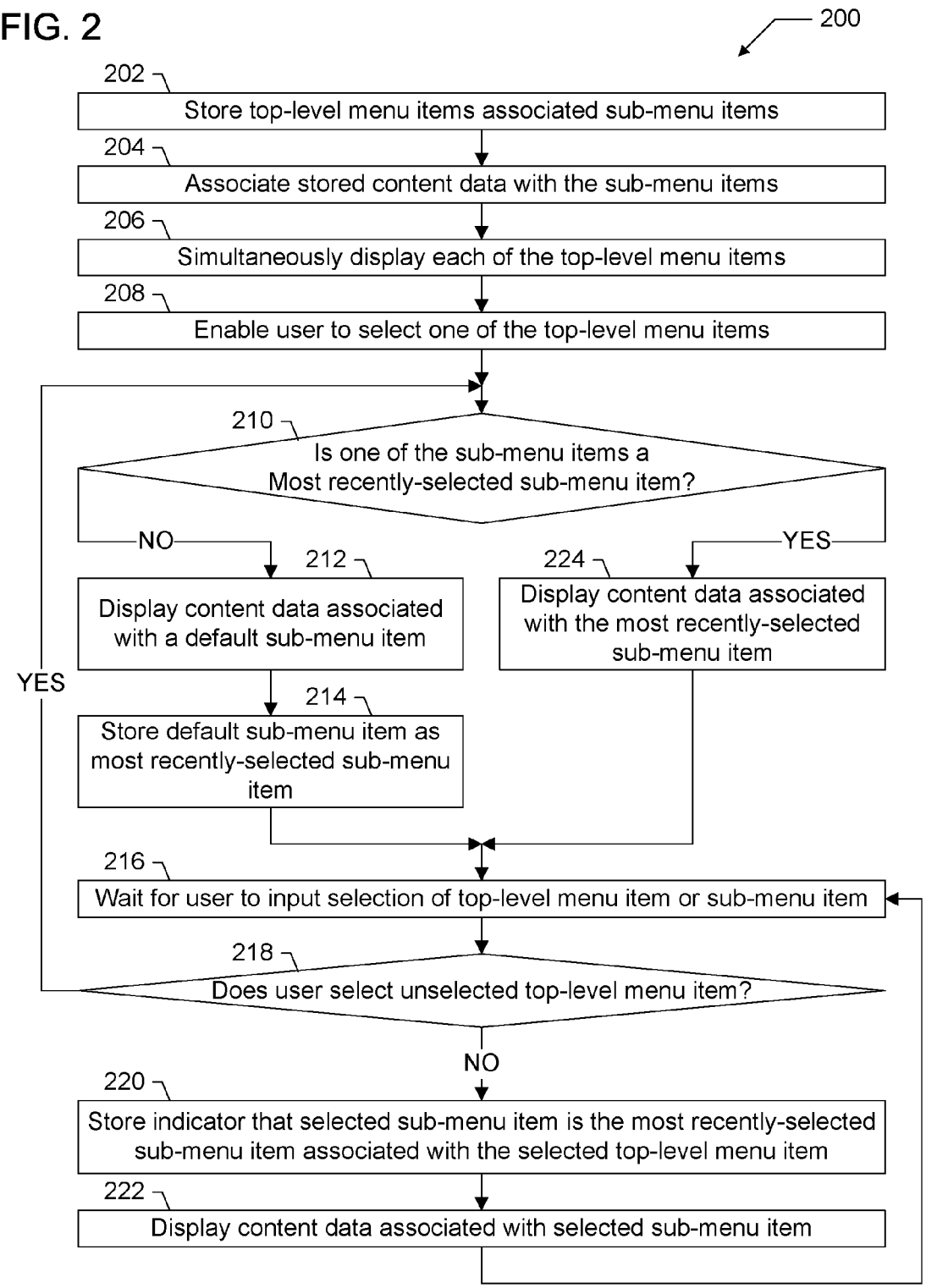
FIG. 2 is a flow chart of an example process for storing content data in a database, generating hierarchical menu items, and enabling an operator to browse the content data via the menu items as disclosed herein.

FIG. 2 is a flow chart of an example process for storing content data in a database, generating hierarchical menu items, and enabling an operator to browse the content data via the menu items as disclosed herein. Although the example process 200 for storing and enabling access to content data is described with reference to the flow chart illustrated in FIG. 2, it should be appreciated that many other methods of storing content data and enabling access to that content data are contemplated. For example, the order of certain of the blocks may be changed, and certain of the blocks described are optional.

The process 200 begins with the creation and storage of one or more top-level menu items usable to access the stored content data (block 202). Each of the created top-level menu items represents a top-level categorization of the content data to be accessed in the database. The categorization may be selected such that the quantity of top-level menu items is easily viewable and simultaneously comprehensible by a human operator of a database access system (e.g., 10 top-level menu items). It should be appreciated that such categorization may enable the operator to easily begin the process of locating desired content data by determining which broad category the sought content data fits into. The top-level menu items may be selected by an individual such as a database administrator, or may be generated automatically such as based on parameters of the data or based on metadata associated with the data at the time the data is inputted.

Each of the top-level menu items in the illustrated embodiment optionally includes at least one associated sub-menu item (block 202). The associated sub-menu items may represent a second level or tier of categorization of data. This second level of categorization may represent data divisions which more accurately and fully reflect the contents of the data, and may enable an operator accessing the data to more effectively browse the content data without viewing the content data itself. For example, a top-level menu item may include three associated sub-menu items which further categorize the data associated with the top-level menu item. By determining which of the three sub-categories the desired content data is in, the operator may select one of the sub-menu items to navigate to the desired content data without viewing the content data itself. The quantity of sub-menu items associated with any of the top-level menu items may be sufficiently small (e.g., 10 sub-menu items) to enable the operator to simultaneously comprehend the universe of the sub-menu items and to quickly and easily select the one sub-menu item with which the desired content data is associated.

Referring still to FIG. 2, the disclosed system next associates stored content data with each of the sub-menu items (block 204). The content data may be previously stored on the storage device 118 of the host device 100. Alternatively, the content data may be stored on the storage device 118 after the creation of the plurality of top-level menu items and the associated sub-menu items, such as in the population of data in a database. For example, an operator may input content data at a remote database client 152 over the Internet or other network 140 such that the newly-input content data is stored on the storage device 118.

The stored content data may represent a destination for an operator accessing the content data—that is, the top-level menu items and the sub-menu items may represent a mechanism for enabling access to the content data associated therewith. An operator of the content data access system disclosed herein may navigate the hierarchical menu structure in order to access content data categorized based on the top-level menu items and based on the sub-menu items. For example, the operator may select a top-level menu item and a sub-menu item associated with the top-level menu item to access content data associated with the selected sub-menu item. Alternatively or in addition, the top-level menu items and associated sub-menu items may represent a mechanism for appropriately determining the location of inputted content data within a database stored on the storage device 118. For example, if an operator wishes to input a set of content data, the operator may navigate the top-level menu items and sub-menu items based on the content data to be input, and upon reaching a lowest level of the hierarchical menu structure, may input the content data in the appropriate location of the database.

After stored content data (e.g., in a database stored on storage device 118) is appropriately associated with a created hierarchical menu (blocks 202 and 204), the disclosed system simultaneously displays some or all of the top-level menu items (block 206). The host device 100 may display these top-level menu items on the display device 120 of the host device 100 to enable an operator located physically locally to the host device 100 to access the content data. Alternatively, the host device 100 may display the top-level menu items to an operator at a remote display device of a remote database client 152 via the Internet or other network 140.

The host device 100 may display the top-level menu items in the form of a menu, such as a menu implemented using a vertically-oriented navigation bar control. The top-level menu items within the navigation bar control may be organized in an appropriate way, such as alphabetically or based on an anticipated access sequence. Alternatively, the top-level menu items may be displayed as a menu control displaying and enabling interaction with a pull-down menu, a plurality of pull-down menus, or any other appropriate selectable listing of the top-level menu items. The disclosed system enables the operator to select one of the top-level menu items (block 208), such as by clicking on it with a mouse or highlighting and selecting it with a keyboard or other input device 114 of the host device 100, or alternatively by inputting a selection at a remote database client 152 using an appropriate input device. It should be appreciated that the functionality of the disclosed content data access system does not depend on and is not impacted by the locality or remoteness of the operator accessing the content data.

When the operator selects one of the top-level menu items (block 208), the disclosed system determines which of the sub-menu items to select and what (if any) content data to display. Specifically, the disclosed system determines whether any of the sub-menu items associated with the selected top-level menu item is a most recently-selected sub-menu item for the selected top-level menu item (block 210). This determination preferably includes at least two possible outcomes—a "NO" outcome, which indicates that the disclosed system has not stored data indicating that any of the sub-menu items associated with the selected top-level menu item have been previously selected, and a "YES" outcome, which indicates that at least one of the sub-menu items associated with the selected top-level menu item has been previously selected.

It should be appreciated that the disclosed content access system may clear any data stored indicating previously selected sub-menu items at the end of a single operator session, based on the expiration of a designated amount of time, upon shutting down or rebooting the host device 100, never, and/or in response to any other suitable event, depending on the implementation. Thus, it should be appreciated that data stored indicating previously selected sub-menu items may indicate whether any operator has previously selected one of the sub-menu items associated with the selected top-level menu item. It should be further appreciated that the presence or absence of data indicating a most recently-selected sub-menu item may represent an indication that an individual operator has not accessed any of the sub-menu items in a given session, through that operator's history of using the system, within a designated amount of time, since the system was last rebooted, or that no operator has ever accessed any of the sub-menu items of the selected top-level menu item.

If the system determines that none of the sub-menu items associated with the selected top-level menu item has been previously selected for the relevant time period (i.e., the "NO" outcome of FIG. 2) (block 210), the system displays each of the sub-menu items associated with the top-level menu items and displays any content data associated with a default one of the sub-menu items (block 212). This default sub-menu item may be determined to be the first sub-menu item in the list of sub-menu items, or may be determined in any other appropriate way. For example, the default sub-menu item may be determined by an application designer. The system displays the default sub-menu item as being the selected sub-menu item, such as by highlighting or otherwise indicating the default sub-menu item. Since the content access system has not previously stored an indication that any of the sub-menu items was a selected sub-menu item, the system also stores an indication that the default sub-menu item is the most recently-selected sub-menu item associated with selected top-level menu item (block 214). It should be appreciated that this stored indication represents that the currently selected sub-menu item (even if selected by default) is the most recently-selected sub-menu item associated with the selected top-level menu item.

The content access system enables the operator to view, modify, or otherwise manipulate the displayed content data associated with the selected sub-menu item (not shown). For example, the disclosed content access system may enable an insurance professional to view insurance information by selecting a "Policies" menu, selecting a "Vehicles" submenu, and viewing policy information about each motorcycle insurance policy issued or sold by the insurance professional. The content access system further enables the operator, upon completion of the desired tasks with respect to the content data, to select (1) any top-level menu item or (2) another one of the sub-menu items associated with the selected top-level menu item (block 216). It should be appreciated that the system may enable this selection by waiting for an operator input indicating a different desired sub-menu item or top-level menu item.

Upon receiving an operator input indicating such a selection, the disclosed system determines whether the operator selected one of the unselected top-level menu items (block 218). If the system determines that the operator did not select one of the unselected top-level menu items (i.e., the operator selected a different one of the sub-menu items associated with the selected top-level menu item), the system determines that the different one of the sub-menu items is now the most recently-selected sub-menu item associated with the selected top-level menu item (block 220). To memorialize this determination, the disclosed system stores an indicator that the newly-selected sub-menu item is the most recently-selected sub-menu item associated with the selected top-level menu item (block 220). Moreover, the system displays the content data associated with the newly-selected sub-menu item (block 222). The system again enables the operator to perform desired tasks (if any) on the displayed content data (not shown) and waits for an operator input selection of either a different top-level menu item or a different sub-menu item associated with the selected top-level menu item (block 216).

If the system determines instead that the operator has selected a different, unselected top-level menu item (block 218), the system determines whether any data stored in association with the newly-selected top-level menu item indicates that one of the associated sub-menu items of the newly-selected top-level menu item is a most recently-selected sub-menu item (block 210). As before, if the system determines that no such data exists (i.e., none of the sub-menu items is a most recently-selected sub-menu item), the system displays the content data associated with a default sub-menu item of the newly-selected top-level menu item (block 212). However, if the system determines that stored data indicates that one of the sub-menu items of the newly-selected top-level menu item is a most recently-selected sub-menu item (block 210), the system displays the content data associated with the most recently-selected sub-menu item in response to the selection of the associated top-level menu item (block 224). Moreover, the system does not update the indicator regarding which of the sub-menu items is a recently-selected sub-menu item, as the indicator which resulted in the "YES" outcome of block 210 accurately represents the most recently-selected sub-menu item. The system again enables the operator to access the displayed content data and waits for the operator to select a different one of the sub-menu items associated with the selected top-level menu item or one of the unselected top-level menu items, as discussed above (block 216).

It should be appreciated that the disclosed content data access system provides a perpetual or substantially perpetual loop wherein after data is stored and a hierarchical menu structure is created, the system enables the operator to navigate the menu structure and view and modify the content data associated with any of the menu items of the hierarchical menu structure.

Prior to a first selection of a top-level menu item (and one of the associated sub-menu items) by any operator, the disclosed system may not store any indication that the top-level menu item has been previously accessed (such as by storing a null pointer). If the system does not store any indication of a default one of the sub-menu items, the system may not display any content data until the operator inputs a first selection of one of the sub-menu items. Thus, the pointer may remain a null pointer until an appropriate data destination is reached based on the operator's inputs. The system may store data indicating that a default one of the sub-menu items is the most recently-selected top-level menu item. In either case, the system may display one of the sub-menu items regardless of whether the operator has previously selected the top-level menu item. Alternatively, if one of the sub-menu items associated with selected top-level menu item has not previously been selected, the system disclosed herein may not display the content data associated with any of the sub-menu items until the operator selects one of them.

It should also be appreciated that the process 200, though described in terms of associating a menu structure with already stored content data, is equally applicable to an existing menu structure and non-existing content data. Specifically, as the content data is stored in the storage device 118, a determination is made regarding which of the sub-menu items is most appropriately associated with the content data.

In the example process illustrated in FIG. 2, only two tiers of menu items are disclosed. That is, the example process of FIG. 2 includes top-level menu items and sub-menu items. It should be appreciated that the disclosed system enables the storage of a plurality of levels or tiers of menu items beyond the two levels illustrated in FIG. 2. Moreover, it should be appreciated that the disclosed system may store a most recently accessed sub-menu item which is not associated with content data, but is associated instead with a plurality of lower-level menu items. Rather than displaying content data upon an operator selecting a top-level menu item, the system may display the plurality of lower-level menu items associated with the most recently-selected sub-menu item. It should be appreciated that depending on the implementation, the stored data indicating a most recently-selected top-level menu item may result in the display of content data for some top-level menu items and may result in the display of lower-level menu items for other top-level menu items.

It should be further appreciated that although the process 200 of FIG. 2 indicates that each top-level menu item is associated with at least one sub-menu item, the disclosed system may include at least one top-level menu item which is not associated with any sub-menu items.

It should be appreciated that one or more of the top-level menu items may also be associated with content data, in addition to the sub-menu items. It should be further appreciated that, as discussed above, one or more of the sub-menu items may not be associated with any content data, but rather may be associated with further tiers of sub-menu items for enabling more detailed categorization of content data.

It should be appreciated that by storing data indicating which (if any) of the sub-menu items of the top-level menu items is the most recently-selected sub-menu item, the disclosed system provides an operator with the ability to quickly access a particular sub-menu item (and the content data associated therewith) simply by selecting the top-level menu item with which the desired content data is associated. The effect of this system of browsing hierarchical data may thus be viewed as caching a plurality of working states for a plurality of top-level menu items. The effect of this system of browsing may alternatively be viewed as providing a plurality of back buttons, wherein by selecting any of the plurality of top-level menu items, the operator is taken back to the previously viewed content data associated with the selected top-level menu item.

FIGS. 3 to 9 each illustrate a sample screen shot displayed by the disclosed content data access system as well as a schematic diagram of the contents of the content data access system storage device 158 which results in the sample screen shot. FIGS. 3 to 9 each include a screen shot section 300 and a memory schematic diagram section 350. It should be further appreciated that various of the determinations made by the database access system as illustrated in FIGS. 3 to 9 may be made by any processor of a multi-processor system such as the multi-processor system including the host device 100 and the database client 152 illustrated in FIG. 1.

Screen shot section 300 of FIG. 3 includes a menu control display area 310 and a content data display area 320. The screen shot of FIG. 3 illustrates a sample screen shot of the disclosed content data access system prior to an operator selecting any of a plurality of top-level menu items and prior to a display of any content data stored in association with any sub-menu items. It should be appreciated that the screen shot illustrated in the section 300 may be displayed on the display device 120 of the host device 100, or alternatively may be displayed on a display device of a remote database client 152.

As illustrated in FIG. 3, the navigation bar area 310 displays a plurality of top-level menu items 302, 304, and 306, each of which represents one of a plurality of top-level categories for content data stored by the disclosed content data access system. It should be appreciated that the top-level menu items 302, 304, and 306 may be displayed as three-dimensional buttons which indicate that an operator can click or otherwise select the buttons using an input device such as a keyboard, mouse, or other input device 114.

The content data display area 320 of FIG. 3 is configured to display any content data associated with a selected sub-menu item (not shown). In the illustrated embodiment, because none of the sub-menu items are selected, the content data access system does not display any content data as indicated by numeral 321. It should be appreciated that the disclosed content data display system may display content data which is not associated with any of the top-level menu items 302, 304, or 306, or may display content data associated with one of the top-level menu items 302, 304, or 306, depending upon the implementation and the desired interface. The content data display area 320 of FIG. 3 also includes a status message display area 340 which is configured to display a status message indicating which content data is currently being displayed and indicating any other pertinent instructions, reminders, or other messages to the operator. In the illustrated embodiment, the status message display area 340 displays a message which indicates that no content data is available for display. The status message display area 340 further displays a message which indicates that the operator may select one of the top-level menu items 302, 304, or 306.

FIG. 3 also illustrates a memory schematic diagram section 350 which includes a schematic diagram of the memory of the storage device 158 connected to the database client 152 at a time corresponding to the time of display of the screen shot in the screen shot section 300. The memory schematic diagram section 350 illustrates the contents of the storage device 158 as a schematic representation of the data structures stored therein. The data represented in the memory schematic section 350 may indicate data which is temporarily stored or cached by a remote database client 152 based on information initially sent from a server such as host device 100.

As illustrated, the storage device 158 stores data representing top-level Menu Item 1 302, data representing top-level Menu Item 2 304, and data representing top-level Menu Item 3 306. This data 302, 304, and 306 indicates that top-level Menu Items 1, 2, and 3 are top-level menu items and do not include any associated content data. Each of top-level Menu Items 1, 2, and 3 is associated with a plurality of sub-menu items, represented in the illustrated embodiment as Sub-Menu Items 302a, 302b, 302c, 304a, 304b, 306a, 306b, and 306c. Each of the sub-menu items is associated with content data such as Content Data 1 370, Content Data 2 371, Content Data 3 372, Content Data 4 373, Content Data 5 374, Content Data 6 375, Content Data 7 376, and Content Data 8 377. It should be appreciated that each set of content data which is associated with one of the sub-menu items is specific to the sub-menu item with which it is associated and represents data categorized by the associated sub-menu item and the parent menu item. It should be further appreciated that the data indicative of the plurality of top-level menu items, sub-menu items, content data, and most-recently selected sub-menu items may be stored on any suitable storage device, such as being stored on the storage device 158 of the database client 152.

In the illustrated embodiment, each top-level menu item 302, 304, and 306 includes a pointer to a most recently-selected sub-menu item, illustrated as boxes and arrows 362, 364, and 366. In the illustrated embodiment, each of the pointers 362, 364, and 366 initially points to a default sub-menu item determined by selecting the first sub-menu item of each top-level menu item. Specifically, the default sub-menu items include Sub-Menu Item 1 302a of top-level Menu Item 1 302, Sub-Menu Item 1 304a of top-level Menu Item 2 304, and Sub-menu Item 1 306a of top-level Menu Item 3 306. It should be appreciated that the determination of the indicated sub-menu items as default sub-menu items is arbitrary—that is, any of the sub-menu items associated with the top-level menu items may be selected as a default sub-menu item. Alternatively, the selection of sub-menu items as default sub-menu items may be made by a database administrator at the time of population of the database, or may be determined by the database administrator at the time of creating the top-level menu items and the associated sub-menu items.

FIG. 4 illustrates a screen shot in the screen shot section 300 and a memory schematic diagram in the memory schematic diagram section 350 after an operator has selected one of the top-level menu items displayed in the menu control display area 310. Specifically, FIG. 4 illustrates a screen shot in the screen shot section 300 which includes the menu control display area 310 and the content data display area 320 of FIG. 3. The menu control display area 310 displays top-level Menu Item 1 302, top-level Menu Item 2 304, and top-level Menu Item 3 306 as in FIG. 3. In the illustrated embodiment, the menu control display area 310 displays an indicator (i.e., a dashed border) associated with top-level Menu Item 2 304, which indicates that the operator has selected top-level Menu Item 2. Consequently, the menu control display area 310 displays any sub-menu items associated with selected top-level Menu Item 2—namely, Sub-Menu Item 1 304a and Sub-Menu Item 2 304b.

Referring now to the memory schematic diagram section 350 of FIG. 4, the database access system determines which of the two Sub-Menu Items 304a and 304b associated with top-level Menu Item 2 304 is the most recently-selected sub-menu item for top-level Menu Item 2 304 based on the pointer 364. In the illustrated embodiment, though the pointer 364 does not indicate a most recently-selected sub-menu item, the pointer 364 does indicate a default sub-menu item 304a associated with top-level Menu Item 2 304. It should be appreciated that the content data access system illustrated in FIG. 4 treats the most recently-selected sub-menu item and the default sub-menu item identically for purposes of determining which content data to display. Because the pointer 364 indicates Sub-Menu Item 1 304a, the content data access system determines that Content Data 4 373 associated with Sub-Menu Item 1 304a is the appropriate content data for display.

Referring again to the screen shot section 300, the disclosed system displays Sub-Menu Item 1 304a as highlighted, indicating that Sub-Menu Item 1 304a is the default sub-menu item. Moreover, the system displays Content Data 4 373 in the content data display area 320 of the screen shot, as indicated by numeral 322. Finally, the system displays a message in status message display area 340 which indicates that Content Data 4 373, which is associated with Sub-Menu Item 1 304a of top-level Menu Item 2 304 is displayed in the content data display area 320. The message also indicates that the operator may select a different top-level Menu Item (such as top-level Menu Items 302 or 306) or a different Sub-Menu Item of top-level Menu Item 2 (such as Sub-Menu Item 2 304b). It should be appreciated that the system may enable the operator to modify the displayed content data and to store any changes made to the displayed content data within the database by updating the data stored on the storage device 158. It should be further appreciated that enabling the operator to so modify the data may not have any impact on the menu control display area 310.

FIG. 5 illustrates the screen shot section 300 and the memory schematic diagram section 350 after an operator has selected Sub-Menu Item 2 304b in the menu control display area 310. It should be appreciated that the operator may have made this selection according to the message displayed in the status message display area 340 as illustrated in FIG. 4. In the illustrated embodiment, selecting Sub-Menu Item 2 304b associated with top-level Menu Item 2 results in Sub-Menu Item 2 304b being highlighted by the content data access system. Because top-level Menu Item 2 304 remains selected, the dashed indicator associated with top-level Menu Item 2 304 remains displayed.

Referring to the memory schematic diagram section 350 of FIG. 5, the selection of a new sub-menu item associated with top-level Menu Item 2 304 results in the pointer 364 associated with top-level Menu Item 2 304 to be moved. Specifically, the pointer 364 moves from pointing to Sub-Menu Item 1 304a to pointing to Sub-Menu Item 2 304b. It should be appreciated that this change reflects the fact that the operator has indicated that Sub-Menu Item 2 is the most recently-selected sub-menu item.

Consistent with the selection of Sub-Menu Item 2 304a of the screen shot section 300, the content data access system disclosed herein displays Content Data 5 374 in the content data display area 320 of the screen shot, as indicated by numeral 323. The system enables the operator to manipulate or view Content Data 5 374 as necessary. The status message display area 340 of FIG. 5 indicates that the content data specific to Sub-Menu Item 2 304b of top-level Menu Item 2 304 is being displayed. The status message display area 340 further indicates that the operator may select a different one of the top-level Menu Items (i.e., top-level Menu Item 1 302 or top-level Menu Item 3 306) or may select a different one of the sub-menu items associated with top-level Menu Item 2 (i.e., Sub-Menu Item 1 304a).

FIG. 6 illustrates the screen shot section 300 and the memory schematic diagram section 350 after the operator has selected a different one of the top-level menu items displayed by the menu control display area 310. Specifically, as illustrated in FIG. 6, the operator has selected top-level Menu Item 3 306 in the menu control display area 310. The system thus hides the sub-menu items associated with the previously selected top-level Menu Item 2 304 and displays the sub-menu items 306a, 306b, and 306c associated with top-level Menu Item 3 306. The system displays a dashed indicator associated with top-level Menu Item 3 306 which indicates that top-level Menu Item 3 is the currently selected top-level menu item. Finally, the menu control display area 310 displays Sub-Menu Item 1 306a as highlighted, indicating that either (1) Sub-Menu Item 1 306a is the default sub-menu item of top-level Menu Item 3 306, or (2) Sub-Menu Item 1 306a is the most recently-selected sub-menu item of top-level Menu Item 3 306.

Referring to the memory schematic diagram section 350, the memory device 318 stores data indicating that top-level Menu Item 3 306 is associated with three sub-menu items 306a, 306b, and 306c. Each of these sub-menu items is associated with a set of content data; specifically, Sub-Menu Item 1 306a is associated with Content Data 6 375, Sub-Menu Item 2 306b is associated with Content Data 7 376, and Sub-Menu Item 3 306c is associated with Content Data 8 377. Moreover, as indicated by the memory schematic diagram section 350, the storage device 158 stores a pointer 366 in association with top-level Menu Item 3 306 which indicates that Sub-Menu Item 1 306a is the default sub-menu item. It should be appreciated that the pointer 364, associated with top-level Menu Item 2 304, still indicates that the most recently-selected sub-menu item of top-level Menu Item 2 304 is Sub-Menu Item 2 304b.

The disclosed system displays Content Data 6 375 in the content data display area 320, as indicated by numeral 324. As discussed, because the pointer 366 indicates that Sub-Menu Item 1 306a is the default sub-menu item, the menu control display area 310 displays Sub-Menu Item 1 306a as highlighted. Finally, the disclosed content data access system displays a message in status message display area 340 indicating that the displayed Content Data 6 375 is the content data associated with the default sub-menu item 306a, and that the operator may select a different sub-menu item associated with top-level Menu Item 3 306 (i.e., Sub-Menu Item 2 306b or Sub-Menu Item 3 306c) or a different top-level menu item (i.e., top-level Menu Item 1 302 or top-level Menu Item 2 304).

FIG. 7 illustrates a screen shot in screen shot section 300 and a memory schematic diagram 350 of the disclosed content data access system after the operator selects Sub-Menu Item 3 306c. Based on this selection, the system highlights Sub-Menu Item 3 306c and moves the pointer 366 from Sub-Menu Item 1 306a to Sub-Menu Item 3 306c. It should be appreciated that so altering the pointer 366 indicates that the most recently-selected sub-menu item associated with top-level Menu Item 3 306 is Sub-Menu item 3 306c. Reflecting this change, the system displays Content Data 8 377 in the content data display area 320, as indicated by numeral 325. It should be appreciated that Content Data 8 377 is associated with Sub-Menu Item 3 306c of top-level Menu Item 3 306. The system displays a message indicating this relationship in status message display area 340 and also displays an indication that the operator may select one of the other sub-menu items of top-level Menu Item 3 306 or one of the other top-level menu items than top-level Menu Item 3 306. It should be appreciated that as illustrated in the memory schematic diagram 350 of FIG. 7, the most recently-selected sub-menu item of top-level Menu Item 2 304 is Sub-Menu Item 2 304b (represented by pointer 364), and the most recently-selected sub-menu item of top-level Menu Item 3 306 is Sub-Menu Item 3 306c (represented by pointer 366).

FIG. 8 illustrates a subsequent selection by the operator of top-level Menu Item 2 304 immediately after the selection of Sub-Menu Item 306c illustrated in FIG. 7. In the illustrated embodiment, the menu control display area 310 displays top-level Menu Item 2 304 as being selected by displaying a dashed indicator in association with top-level Menu Item 2. The system examines the pointer 364 associated with top-level Menu Item 2 304 to determine whether any of the sub-menu items associated with top-level Menu Item 2 304 is the most recently-selected menu-item. The pointer 364 indicates that Sub-Menu Item 2 304b is the most recently-selected sub-menu item. Thus, the system displays Content Data 5 374 associated with Sub-Menu Item 2 304b immediately upon selection of top-level Menu Item 2 304 by the operator. Specifically, the system displays Content Data 5 374 in content data display area 320, as indicated by numeral 323. Moreover, because Sub-Menu Item 2 304b is the most recently-selected sub-menu item associated with top-level Menu Item 2 304, the system immediately displays Sub-Menu Item 2 304b as highlighted. Finally, the system displays a message in status message display area 340 indicating that Content Data 5 374 is the content data associated with the most recently-viewed sub-menu item of top-level Menu Item 2 304. It should be appreciated that, in contrast with the content data displayed in FIG. 4 (i.e., the previous selection of top-level Menu Item 2 304), the most recently-selected sub-menu item of FIG. 8 changed, and the content data access system disclosed herein displayed the content data associated with the new most recently-selected sub-menu item of top-level Menu Item 2 304.

FIG. 9 illustrates similar functionality to that illustrated in FIG. 8. Specifically, FIG. 9 illustrates the screen shot section 300 and the memory schematic diagram section 350 after the operator selects top-level Menu Item 3 306 immediately following the displayed selection in FIG. 8. In the illustrated embodiment, the menu control display area 310 displays top-level Menu Item 3 306 as being selected by displaying a dashed indicator in association with top-level Menu Item 3, as discussed above with respect to FIG. 6. The system examines the pointer 366 associated with top-level Menu Item 3 306 to determine whether any of the sub-menu items associated with top-level Menu Item 3 306 is the most recently-selected menu-item. The pointer 366 indicates that Sub-Menu Item 3 306c is the most recently-selected sub-menu item associated with top-level Menu Item 3 306. Thus, the system displays Content Data 8 377 associated with Sub-Menu Item 3 306c immediately upon selection of top-level Menu Item 3 304 by the operator. Specifically, the system displays Content Data 8 377 in content data display area 320, as indicated by numeral 325. Moreover, because Sub-Menu Item 3 306c is the most recently-selected sub-menu item associated with top-level Menu Item 3 306, the system immediately displays Sub-Menu Item 3 306c as highlighted. Finally, the system displays a message in status message display area 340 indicating that Content Data 8 377 is the content data associated with the most recently-viewed sub-menu item of top-level Menu Item 3 306. It should be appreciated that, in contrast with the content data displayed in FIG. 6 (i.e., the previous selection of top-level Menu Item 3 306), the most recently-selected sub-menu item of FIG. 8 changed, and the content data access system disclosed herein displayed the content data associated with the new most recently-selected sub-menu item of top-level Menu Item 3 306.

The disclosed content data access system may be viewed as providing multiple back buttons for enabling an operator to return directly to content data associated with a most recently-selected sub-menu item of a different top-level menu item. Specifically, the selection of top-level Menu Item 2 illustrated by FIG. 8 may be seen as the operator clicking a "back" button to bring the operator back to the content data displayed most recently regarding top-level Menu Item 2. That is, the selection of FIG. 8 may be viewed as a "back" button to bring the operator back to the state illustrated in FIG. 4. Similarly, the selection of FIG. 9 may be viewed as a "back" button to bring the operator back to the state illustrated in FIG. 6. It should be appreciated that the disclosed content data access system thus stores state data about each top-level menu item and enables an operator to quickly and easily return to the exact state associated with any of the top-level menu items.

The disclosed content data access system may be implemented on a system which includes a server such as host device 100 and a remote client such as remote database client 152. In such a content data access system, the host device 100 may send a plurality of screen files to the remote database client 152, and the remote database client 152 may display data contained in the screen files in a display control generated and updated by the remote client 152. Each screen file may be a serialized binary representation of a plurality of display control elements for display in the display control of the remote client. One or more screen files may include data indicative of a display control element which may enable the remote client 152 to display a plurality of top-level menu items, sub-menu items, and/or content data. It should be appreciated that the remote client 152 may locally store (such as by caching) data representing a most-recently selected sub-menu item for a plurality of the top-level menu items. The display control element data may enable the remote client 152 to make this determination. Alternatively, a server such as host device 100 may store the data indicating a most-recently selected sub-menu item for a plurality of top-level menu items, such as by storing data on the storage device 118 as illustrated in FIGS. 3 to 8. It should be appreciated that the disclosed content data access system is not limited by a particular processor and/or memory device within a multi-processor/multi-memory device system for storing data indicating a plurality of most-recently selected sub-menu items.

As noted above, the content data access system disclosed herein may be implemented in a host device 100. The host device 100 may enable an operator to access the content data using the system by viewing the content data and entering input on local devices such as local display devices 120 and local input devices 114. Alternatively, the disclosed content data access system may enable an operator to access content as disclosed over a network 140 such as the Internet. The operator may view data and input changes and navigation commands at a remote database client 152.

The disclosed system may be used in conjunction with software which facilitates thin client implementations of the remote database client 152. For example, the disclosed system may be used in conjunction with software which sends only display data to a remote database client 152. The remote database client 152 may not perform any processing; it may merely act as a remote monitor or terminal for displaying output and receiving input generated by the host device 100.

The disclosed host device 100 may also enable the database client 152 to act as a thick client. That is, the disclosed host device 100 may enable the database client to send commands directly to the storage device 118 and may rely on the remote database client to perform most of the logic required to display the disclosed menu control. For example, the remote database client 152 may include data for handling input events, for determining which content data to display, and for manipulating the data contained within the database on the storage device 118 of the host device 100.

Regardless of whether the host system 100 enables an operator to directly interact with the host system 100, or enables an operator at a database client 152 is acting as a thin client or a thick client to interact with the host system 100 via a network 140, the disclosed system enables an operator to navigate to a first desired set of content data, subsequently navigate to a second desired set of content data, and subsequently return to the first desired set of content data simply by selecting the top-level menu item with which the content data is hierarchically associated. The disclosed system further enables the operator to quickly and easily switch between recently viewed or edited content data associated with multiple top-level menu items without requiring the operator to re-traverse the layers of top-level menu items and sub-menu items.

The disclosed system may enable this quick switching to and from not only content data, but to and from any state associated with a menu item at any level of a hierarchical menu structure. Thus, the disclosed system, in a broad sense, stores state data representing a plurality of "most recent" states in association with a plurality of state categories. By selecting one of the state categories, the disclosed system enables an operator to return to the most recent state associated with that category.

The disclosed content data access system may be implemented to provide access to any type of data storable on a storage device such as storage devices 118 or 158. For example, the content data access system may be implemented to enable individuals to efficiently update database records. The content data access system may alternatively be implemented to enable individuals to quickly retrieve data from a large database. The content data access system may be implemented in the context of the World Wide Web to enable individuals using browser software to quickly navigate complex websites. In each of these contexts, the disclosed content data access system enables an operator to quickly return to previously accessed content data without having to re-navigate through a tiered or hierarchical menu structure.

The disclosed system may also be applicable in the context of file browsing software, such as file browsing software built into operating systems. For example, the disclosed system may enable an operator of an operating system to browse a plurality of folders representing a file structure, wherein at least two of the folders are top-level folders having associated sub-folders. The system may store data for each of the top-level folders representing a most-recently browsed sub-folder, and may enable the operator to subsequently return to the top-level folder and view the contents of the sub-folder immediately upon selecting the top-level folder. Thus, the interface described herein may be utilized to enable quick access to most recently viewed files of a file browser system.

The disclosed may enable storing or caching of most-recently viewed menu items at a plurality of different hierarchical levels of a menu structure. For example, the disclosed system, for a menu structure including first and second top-level menu items, may store representations of the most recently viewed sub-menu item associated with both the first and second top-level menu items. Moreover, for the plurality of sub-menu items associated with the first and second top-level menu items, the disclosed system may store a most-recently accessed sub-sub-menu item associated with the sub-menu items. The disclosed system may thus support recursively storing state data regarding menu items at varying levels of a hierarchical menu structure, and may enable an operator to return to the most-recently accessed menu items at a given level of the hierarchical structure upon an appropriate input.

It should be appreciated that the disclosed content data access system is not limited by the data structures or storage locations described above. For example, the pointers 362, 364, and 366 described above may in various embodiments not be pointers to memory locations, but may be actual data stored representing one of the sub-menu items. Similarly, the disclosed content data access system need not be applied in the context of hierarchical data of the structure described herein. Rather, the disclosed content access system may be applied for any suitable hierarchical data structure and for any suitable type of content data.

The discussion above of a two-level menu structure wherein each of the sub-menu items includes associated content data is provided by way of example only and should not be construed as limiting the scope of the disclosed system. Nor should the discussion above relating to displaying the plurality of top level categories as top-level menu items in a vertically expanding and collapsing list of menu items be viewed as limiting—rather, the disclosed system includes displaying the categories with which the cached states are stored in any way suitable for a given implementation.

In summary, a system and methods for providing access to content data, including tracking most recently-accessed content data for each of a plurality of menu items, have been provided. It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of displaying a navigation control, the method comprising:
displaying a first top-level menu item, a second top-level menu item, and a third top-level menu item, wherein the first top-level menu item is associated with at least two sub-menu items, wherein the second top-level menu item is associated with at least two sub-menu items, and wherein each of the sub-menu items is associated with content data;
enabling an operator to input a first indication of the first top-level menu item;
displaying the sub-menu items associated with the first top-level menu item;
enabling the operator to input a second indication of a first desired sub-menu item associated with the first top-level menu item;
displaying first desired content data associated with the first desired sub-menu item;
enabling the operator to input a third indication of the second top-level menu item;
displaying the sub-menu items associated with the second top-level menu item;
enabling the operator to input a fourth indication of a second desired sub-menu item associated with the second top-level menu item;
displaying second desired content data associated with the second desired sub-menu item;
enabling the operator to input a fifth indication of the third top-level menu item; and enabling the operator to input a sixth indication of either the first top-level menu item or the second top-level menu item, wherein:

in response to the operator inputting the sixth indication of the first top-level menu item, displaying (i) the first desired sub-menu item associated with the first top-level menu item as visually highlighted, (ii) the first desired content data associated with the first desired sub-menu item, and (iii) a first status message indicating that the first desired content data associated with the first desired sub-menu item is displayed based on the second indication of the first desired sub-menu item as a most recently viewed sub-menu item of the first top-level menu item indicated by the sixth indication, and in response to the operator inputting the sixth indication of the second top-level menu item, displaying (i) the second desired sub-menu item associated with the second top-level menu item as visually highlighted, (ii) the second desired content data associated with the second desired sub-menu item, and (iii) a second status message indicating that the second desired content data associated with the second desired sub-menu item is displayed based on the fourth indication of the second desired sub-menu item as a most recently viewed sub-menu item of the second top-level menu item indicated by the sixth indication.

2. The method of claim 1, which includes, upon receiving the first indication, displaying the first top-level menu item as a selected top-level menu item, upon receiving the third indication, displaying the second top-level menu item as the selected top-level menu item, and upon receiving the fifth indication, displaying the third top-level menu item as the selected top-level menu item.

3. The method of claim 1, which includes storing content data in association with the at least one of the sub-menu items.

4. The method of claim 3, wherein the content data includes data stored in a database of insurance information.

5. The method of claim 3, which includes, for any displayed content data, enabling the operator to modify the content data and which also includes storing the modification in a database of insurance information.

6. The method of claim 1, wherein each of the plurality of top-level menu items is displayed in a vertical menu bar.

7. The method of claim 1, which includes hiding the sub-menu items when a top-level menu item not associated with the sub-menu items is selected.

8. A method of displaying a navigation control, the method comprising:

storing a plurality of menu items and data representing a plurality of hierarchical relationships between the menu items;

determining a plurality of top-level menu items based on the data representing the hierarchical relationships, at least one of the top-level menu items including at least one associated lower-level menu item;

enabling an operator to input a first indication of a first one of the top-level menu items associated with at least one lower-level menu item;

displaying the at least one lower-level menu item associated with the indicated top-level menu item;

enabling the operator to input a second indication of one of the lower level-menu items associated with the indicated top-level menu item;

displaying content data associated with the second indication;

storing data in association with the first one of the top-level menu items representing the indicated lower-level menu item;

enabling the operator to input a third indication of a second one of the top-level menu items;

enabling the operator to input a fourth indication of a third one of the top-level menu items; and for a fifth indication of the first one of the top-level menu items, displaying (i) the lower-level menu item represented by the stored data as visually highlighted, (ii) the content data associated with the second indication, and (iii) a status message indicating that the content data associated with the second indication is displayed based on the second indication of the lower level-menu item as a most recently viewed lower-level menu item of the first one of the top-level menu item indicated by the fifth indication.

9. The method of claim 8, which includes storing content data in association with the indicated lower-level menu item.

10. The method of claim 9, wherein the content data includes at least a portion of a database, and which includes enabling the operator to input a modification to the content data.

11. The method of claim 8, wherein at least one of the top-level menu items is associated with content data, which includes, for an input of the indication of one of the top-level menu items, displaying the content data associated with the indicated top-level menu item.

12. The method of claim 8, which is configured to operate over a data network.

13. The method of claim 12, wherein the data network is an internet.

14. A database access system comprising:

at least one input device;

at least one memory device;

at least one display device; and at least one processor programmed to operate with the at least one input device, the at least one memory device, and the at least one display device to:

(a) store a plurality of menu items and data representing a plurality of hierarchical relationships between the menu items;

(b) determine a plurality of top-level menu items based on the data representing the hierarchical relationships, at least one of the top-level menu items including at least one associated lower-level menu item;

(c) enable an operator to input a first indication of a first one of the top-level menu items associated with at least one lower-level menu item;

(d) display the at least one lower-level menu item associated with the indicated top-level menu item;

(e) enable the operator to input a second indication of one of the lower level-menu items associated with the indicated top-level menu item;

(f) display content data associated with the second indication;

(g) store data in association with the first one of the top-level menu items representing the indicated lower-level menu item;

(h) enable the operator to input a third indication of a second one of the top-level menu items;

(i) enable the operator to input a fourth indication of a third one of the top-level menu items; and (j) for a fifth indication of the first one of the top-level menu items, display (i) the lower-level menu item represented by the stored data as visually highlighted, (ii) the content data associated with the second indication, and (iii) a status message indicating that the content data associated with the second indication is displayed based on the second indication of the lower level-menu item as a most recently viewed lower-level menu item of the first one of the top-level menu item indicated by the fifth indication.

15. The database access system of claim 14, wherein the at least one processor is programmed to store content data in association with the indicated lower-level menu item.

16. The database access system of claim 15, wherein the content data includes at least a portion of a database, and wherein the at least one processor enables the operator to input a modification to the content data.

17. The database access system of claim 14, wherein at least one of the top-level menu items is associated with content data and wherein the at least one processor is programmed, for an input of the indication of one of the top-level menu items, to display the content data associated with the indicated top-level menu item.

18. The database access system of claim 14, which includes at least one network interface device, and wherein the at least one processor is programmed to operate with the at least one input device via the at least one network interface device.

19. The database access system of claim 18, wherein the at least one processor is programmed to operate with the at least one input device and the at least one network interface device to enable the operator to indicate the top-level menu items and the lower-level menu item using a data network.

20. The database access system of claim 19, wherein the data network is an internet.

21. A non-transitory machine readable medium storing instructions structured to cause an apparatus to:
(a) store a plurality of menu items and data representing a plurality of hierarchical relationships between the menu items;
(b) determine a plurality of top-level menu items based on the data representing the hierarchical relationships, at least one of the top-level menu items including at least one associated lower-level menu item;
(c) enable an operator to input a first indication of a first one of the top-level menu items associated with at least one lower-level menu item;
(d) display the at least one lower-level menu item associated with the indicated top-level menu item;
(e) enable the operator to input a second indication of one of the lower level-menu items associated with the indicated top-level menu item;
(f) display content data associated with the second indication;
(g) store data in association with the first one of the top-level menu items representing the indicated lower-level menu item;
(h) enable the operator to input a third indication of a second one of the top-level menu items;
(i) enable the operator to input a fourth indication of a third one of the top-level menu items; and
(j) for a fifth indication of the first one of the top-level menu items, display (i) the lower-level menu item represented by the stored data as visually highlighted, (ii) the content data associated with the second indication, and (iii) a status message indicating that the content data associated with the second indication is displayed based on the second indication of the lower level-menu item as a most recently viewed lower-level menu item of the first one of the top-level menu item indicated by the fifth indication.

22. The non-transitory machine readable medium of claim 21, wherein the instructions are structured to cause the apparatus to store content data in association with the indicated lower-level menu item.

23. The non-transitory machine readable medium of claim 22, wherein the content data includes at least a portion of a database, and wherein the instructions are structured to cause the apparatus to enable the operator to input a modification to the content data.

24. The non-transitory machine readable medium of claim 21, wherein at least one of the top-level menu items is associated with content data and wherein the instructions are structured to cause the apparatus, for an input of the indication of one of the top-level menu items, to display the content data associated with the indicated top-level menu item.

25. The non-transitory machine readable medium of claim 21, wherein the instructions are structured to cause the apparatus to enable the operator to indicate the top-level menu items and the lower-level menu item using a data network.

26. The non-transitory machine readable medium of claim 25, wherein the data network is an internet.

27. The method of claim 1, wherein in response to the operator inputting the sixth indication of the first top-level menu item, the first desired sub-menu item is visually highlighted with at least one of a different background color and a different text color, and in response to the operator inputting the sixth indication of the second top-level menu item, the second desired sub-menu item is visually highlighted with at least one of the different background color and the different text color.

28. The method of claim 1, wherein in response to the operator inputting the sixth indication of the first top-level menu item, the first desired sub-menu item is visually highlighted with at least one of a same font and a same font size as a different sub-menu item, and in response to the operator inputting the sixth indication of the second top-level menu item, the second desired sub-menu item is visually highlighted with at least one of the same font and the same font size as the different sub-menu item.

29. The method of claim 1, wherein in response to the operator inputting the sixth indication of the first top-level menu item, the first desired sub-menu item is visually highlighted with at least one of a darker shade and a lighter shade in comparison to a shade of another sub-level menu item, and in response to the operator inputting the sixth indication of the second top-level menu item, the second desired sub-menu item is visually highlighted with at least one of the darker shade and the lighter shade.

30. The method of claim 1, wherein in response to the operator inputting the sixth indication of the first top-level menu item, the first desired sub-menu item is visually highlighted with a dashed border, and in response to the operator inputting the sixth indication of the second top-level menu item, the second desired sub-menu item is visually highlighted with the dashed border.

31. The method of claim 8, wherein the lower-level menu item is visually highlighted with at least one of a different background color and a different text color.

32. The method of claim 8, wherein the lower-level menu item is visually highlighted with the lower-level menu item having at least one of a same font and a same font size as another lower-level menu item.

33. The method of claim 8, wherein the lower-level menu item is visually highlighted with at least one of a darker shade and a lighter shade in comparison to a shade of another lower-level menu item.

34. The method of claim 8, wherein the lower-level menu item is visually highlighted with a dashed border.

* * * * *